J. BLACKBURN.
CAR FENDER.
APPLICATION FILED DEC. 26, 1908.
956,470.
Patented Apr. 26, 1910.
2 SHEETS—SHEET 2.
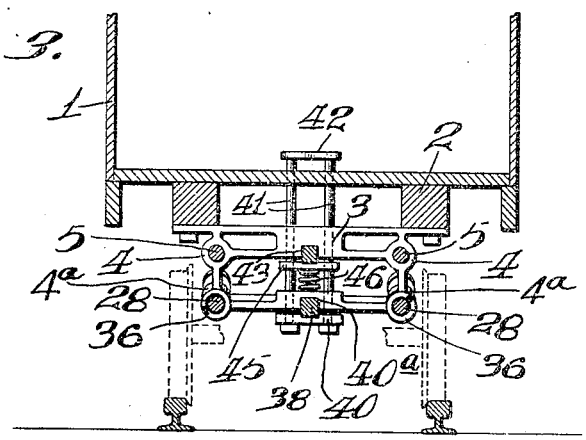
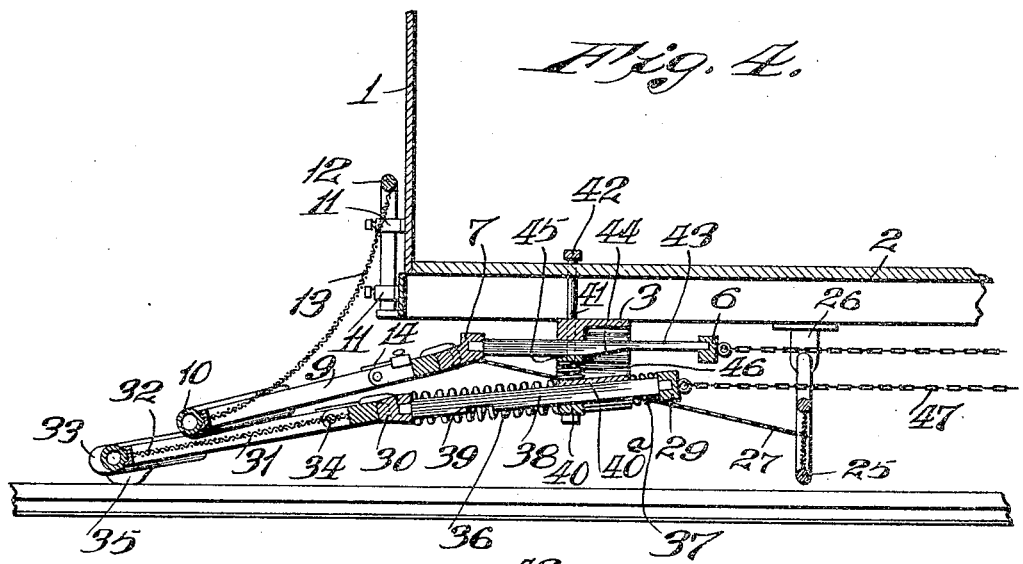
Attest.
H. G. Fletcher
M. P. Smith
Inventor
Jasper Blackburn.
By Higdon Longan
attys.

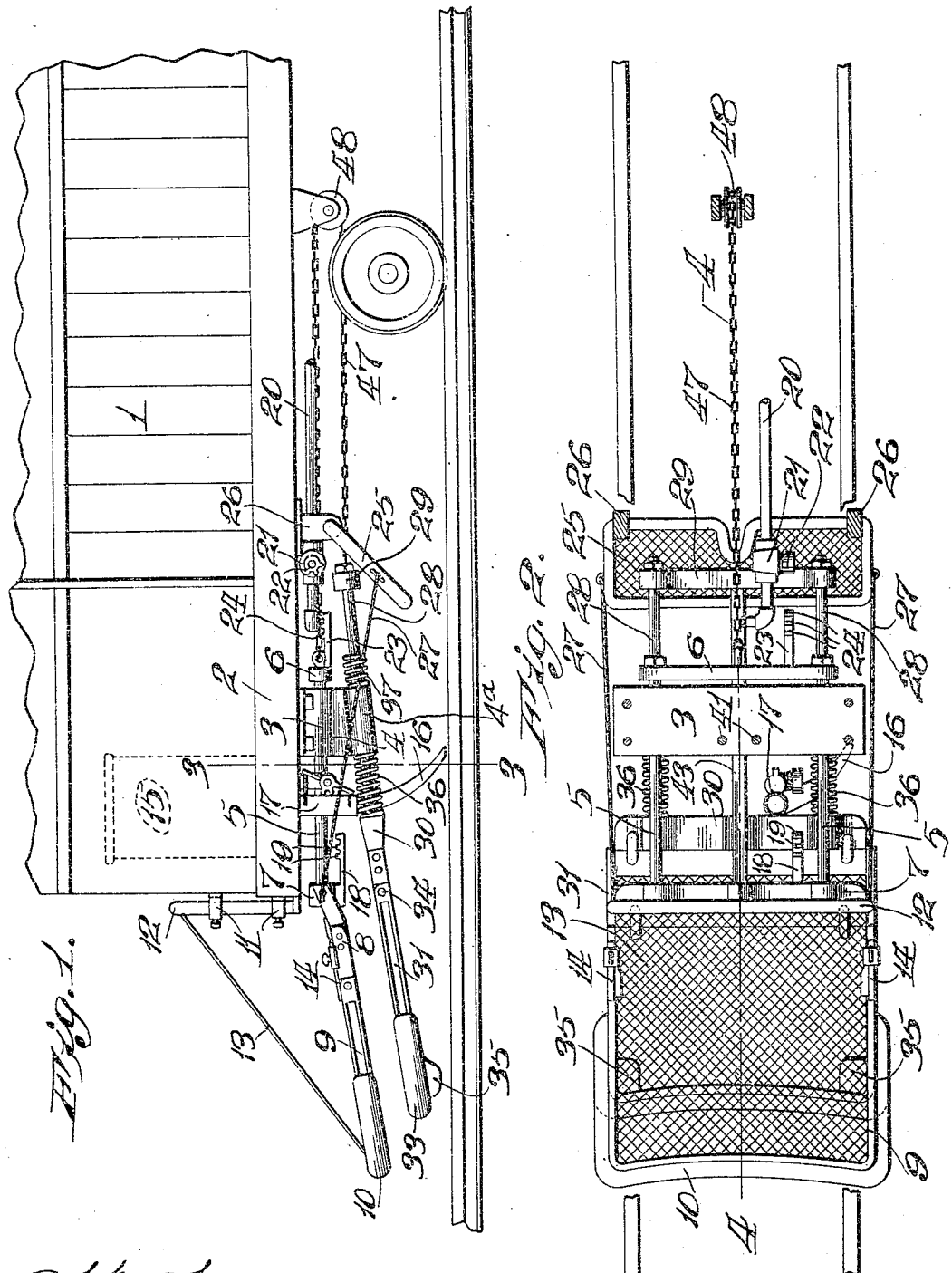

UNITED STATES PATENT OFFICE.

JASPER BLACKBURN, OF KIRKWOOD, MISSOURI.

CAR-FENDER.

956,470.  Specification of Letters Patent.  Patented Apr. 26, 1910.

Application filed December 26, 1908. Serial No. 469,198.

*To all whom it may concern:*

Be it known that I, JASPER BLACKBURN, a citizen of the United States, and resident of Kirkwood, St. Louis county, Missouri, have invented certain new and useful Improvements in Car-Fenders, of which the following is a specification containing a full, clear, and exact description, reference being had to the accompanying drawings, forming a part hereof.

My invention relates to a car fender, my object being to construct a simple, inexpensive fender particularly adapted for street cars and the like, which operates automatically when a portion of the fender comes in contact with an object, and said fender being also under control of the motorman or car driver.

A further object of my invention is to construct a fender having a receiving net projecting in front of the dashboard of the car, and also with a fender frame arranged beneath the body of the car, and immediately in front of the trucks, which fender frame receives an object if the same should for any reason pass beneath the projecting portion of the fender.

A further object of my invention is to construct a fender which will automatically open a valve to set the air brakes of the car on which the fender is located, and to automatically open a valve to permit sand to be discharged onto the track rails, and which automatic opening of the valves takes place when the fender is tripped for operation.

To the above purposes, my invention consists in certain novel features of construction and arrangement of parts which will be hereinafter more fully set forth, pointed out in the claims, and illustrated in the accompanying drawings, in which:

Figure 1 is a side elevation of the forward end of a car and showing a fender of my improved construction in position thereon; Fig. 2 is a plan view of the fender, the same being detached from the car; Fig. 3 is a vertical section taken approximately on the line 3—3 of Fig. 1; Fig. 4 is a vertical section taken on the line 4—4 of Fig. 2; and Fig. 5 is a detail section and showing the positions of certain parts of the fender after the same is tripped.

Referring by numerals to the accompanying drawings: 1 designates the car body, 2 the car platform, to the under side of which is rigidly fixed a transversely disposed bracket or hanger 3, in the ends of which are formed bearings 4 and 4$^a$.

Arranged to slide through the upper pair of bearings 4 are rods 5, the rear ends of which are connected by a cross bar 6, and the forward ends of which are connected by a cross bar 7. Carried by the ends of this cross bar 7 are forwardly projecting arms to which arms 8, are riveted or bolted to the forward ends of which are hinged the rear ends of a rectangular frame 9, which forms the body of the upper and tripping member of the fender, and the front rail of this frame 9 is provided with a pneumatic cushion 10.

Held for vertical adjustment in brackets 11 fixed on the dashboard of the car is a vertically disposed frame 12, to the upper end of which is fixed the top of a net 13, the lower end of which is fixed to the front end of the frame 9.

Flat springs 14 are detachably arranged on the arms 8 and the front ends of said springs bear on the rear ends of the frame 9, thus normally holding said frame in an approximately horizontal position, and when desired these springs 14 can be detached to permit the frame 9 to be swung upward against the frame 12.

15 designates the sand box located on the platform 2, and leading downward therefrom is a spout 16, which is so arranged as to discharge sand onto one of the track rails, and located in the upper portion of said spout is an ordinary sand discharge valve 17.

Carried by the cross bar 7 is a horizontally disposed finger 18, the rear end of which is provided with a series of teeth 19, which when the fender frame 9 moves rearward, engage with corresponding teeth formed on a portion of the valve 17, thus opening said valve and permitting the discharge of sand through the spout 16.

20 designates one of the pipes of the air brake system carried by the car, in which pipe is located a valve 21, which valve controls the passage of air through the pipe 20 to said car brakes, and located on the end of this valve 21 is a segment 22.

Carried by the cross bar 6 is a finger 23, the rear end of which is provided with a series of teeth 24, which, when the fender frame 9 and rods 5 move rearward, engage the teeth of the segment 22, thus opening the valve 21 and setting the air brakes.

25 designates a rectangular fender, the upper end of which is hinged to brackets 26 depending from the under side of the car body in front of the trucks, and connecting the ends of said frame 25 with the arms 8 are cables 27.

When the fender frame 9 occupies a forward or set position, the fender frame 25 is held by the cables 27 in the position seen in Fig. 1, with its lower end swung forward and upward, away from the track rails.

Arranged to slide through the lower pair of bearings 4 are rods 28, the rear ends of which are connected by a cross bar 29, and the forward ends of which are connected by a cross bar 30, and carried by this cross bar 30 is a rectangular fender frame 31, provided with a net 32, and the front rail of said fender frame 31 being provided with a pneumatic cushion 33. The side rails of this frame 31 are provided with hinges 34, in order that the main body portion of said frame can be swung upward against the end of the dashboard when the frame 9 is likewise swung upward. The forward end of the frame 31 is provided with shoes 35, which ride directly upon the track rails when said frame 31 receives an object.

Located upon the forward portions of the rods 28 between the ends of the cross bar 30 and the lowermost pair of bearings 4ª are expansive coil springs 36, and located on said rods 28 to the rear of the lowermost pair of bearings 4 are cushion springs 37.

A bar 38 is arranged midway between the rods 28 and has its ends seated in the cross bars 29 and 30, and formed in the under side of said bar 38 is a notch 39. This bar 38 slides through a bearing 40ª formed in the under side of the bracket 3, and when the fender is in its set position the notch 39 is engaged by a cross bar 40, carried by the lower ends of a pair of vertically disposed rods 41, which operate through the bracket 3, and their upper ends being provided with a plate 42 within the platform 2.

A bar 43 is disposed midway between the rods 5, the ends of said bar being seated in the cross bars 6 and 7, and formed on the under side of said bar 43 is an inclined face 44, which is adapted to engage against a cross bar 45 carried by the rods 41, and interposed between this cross bar 45 and the lower portion of the bracket 3 is an expansive coil spring 46.

One end of the chain or cable 47 is attached to the center of the cross bar 6, and said chain or cable passes rearward around the pulley 48 arranged beneath the car body, and the opposite end of said chain or cable is attached to the center of the cross bar 29, and thus when the fender frame 9 moves rearward, as a result of contact with an object, the fender frame 31 is free to move forward, and vice versa.

When a fender of my improved construction is in its normal or set position, the various parts are in the positions seen in Figs. 1, 2 and 5, with the cross bar 40 occupying the notch 39, and when the parts are so held the expansive springs 36 are compressed.

When the forward portion of the fender frame strikes an object, said fender frame and the rods 5 will be moved rearward, which action moves the bar 43 rearward, and as the inclined face 44 bears against the cross bar 45, said cross bar will be moved downward a short distance, thus moving the rods 41 downward, and withdrawing the cross bar 40 from the notch 36. As soon as this action takes place, the bar 38 is free and the power stored in the coil springs 36 now acts to throw the rods 28 forward, in turn throwing the fender frame 31 forward into position to receive the object struck by the fender frame 9, and as the fender frame 31 and parts carried thereby are thus thrown forward by the action of the springs 36, the chain or cable 47 will be pulled in such a manner as to draw the rods 5 and fender frame 9 rearward, which action loosens the netting 13, and the frame assumes the position shown in Fig. 4 to form a pocket to receive the object struck by the fender.

As the rods 9 and fender frame 9 move rearward, the teeth 19 on the finger 18 will engage with corresponding parts of the sand discharge valve 17, thus opening said valve to permit the discharge of sand onto one of the track rails, and at the same time the teeth of the finger 23 will engage with the teeth of the segment 22, thus opening the air valve 21 which controls the setting of the brakes on the car. The rearward movement of the fender frame 9 also permits the frame 25 to swing downward into a vertical position, as seen in Fig. 4, and thus an object will be caught by said fender frame 25 if for any reason said object passes beneath the frame 31.

After the fender has been tripped and it is desired to set the same for use the frame 9 is engaged and pulled forward, which action draws the frame 31 rearward, and when the cross bar 40 engages in the notch 36 the various parts will be held in their set positions.

My improved fender may be released to engage and receive an object on the track by pedally engaging the plate 41 and depressing the same, which action moves the bar 40 out of the notch 36.

A fender of my improved construction is comparatively simple, operates automatically, and when released automatically opens a sand discharge valve and also an air valve controlling the setting of the air brakes of the car.

I claim:

1. The combination with a car having an air brake valve of a pair of fender frames arranged to slide longitudinally beneath the car platform, a flexible connection between the rear portions of said fender frames whereby said fender frames move in opposite directions relative to one another when actuated and means whereby movement of the fender frames will open or close the air brake valve.

2. The combination with a car having an air brake valve and a sand box valve of a pair of fender frames arranged to slide longitudinally beneath the car platform, a flexible connection between the rear portions of said fender frames whereby said fender frames move in opposite directions relative to one another when actuated, springs arranged to impart a forward movement to one of the fender frames and means whereby the movement of the fender frames will operate said valves.

3. The combination with a car of a pair of fender frames carrying nets and arranged to slide longitudinally beneath the car platform, a flexible connection between the rear portions of said fender frames whereby said fender frames move in opposite directions relative to one another when actuated, and a third fender frame hinged beneath the car body to the rear of the pair of fender frames a net carried by said third frame and connections between said third fender frame and one of the first mentioned fender frames.

4. A car fender, comprising a pair of fender frames carrying nets and arranged to move longitudinally beneath a car platform and which fender frames move in opposite directions relative to one another when actuated, and means carried by one of the fender frames for actuating the discharge valve of a sand box carried by the car, and an air brake control valve carried by the car.

5. The combination with a car of a bracket arranged beneath the car platform, rods arranged to slide through said bracket, fender frames having nets carried by the forward ends of the rods, connections between the rods whereby one of the fender frames moves forward as the opposite fender frame moves rearward, means whereby the fender frames are normally held in a set position a third fender frame hinged to the bottom of the car and connections between said frame and the first mentioned frames.

6. The herein described car fender, comprising a fender frame arranged to move longitudinally beneath the car platform, compression springs arranged to throw said fender frame forward, means whereby said fender frame is held in a set position, a second fender frame arranged to move longitudinally above the first mentioned fender frame, connections between the two fender frames whereby said frames move in reverse directions when the spring actuated frame is released and means whereby when the second mentioned frame is struck by an object the first mentioned frame will be released and thrown forward.

In testimony whereof, I have signed my name to this specification, in presence of two subscribing witnesses.

JASPER BLACKBURN.

Witnesses:
M. P. SMITH,
E. L. WALLACE.